April 16, 1963 B. T. MACAULEY 3,085,565
SOLAR ENERGY DEVICE
Filed March 10, 1961 2 Sheets-Sheet 1
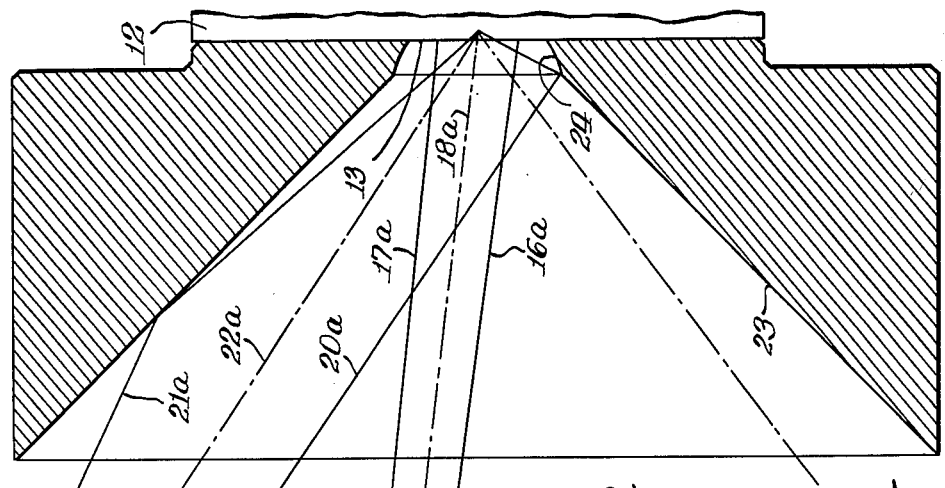
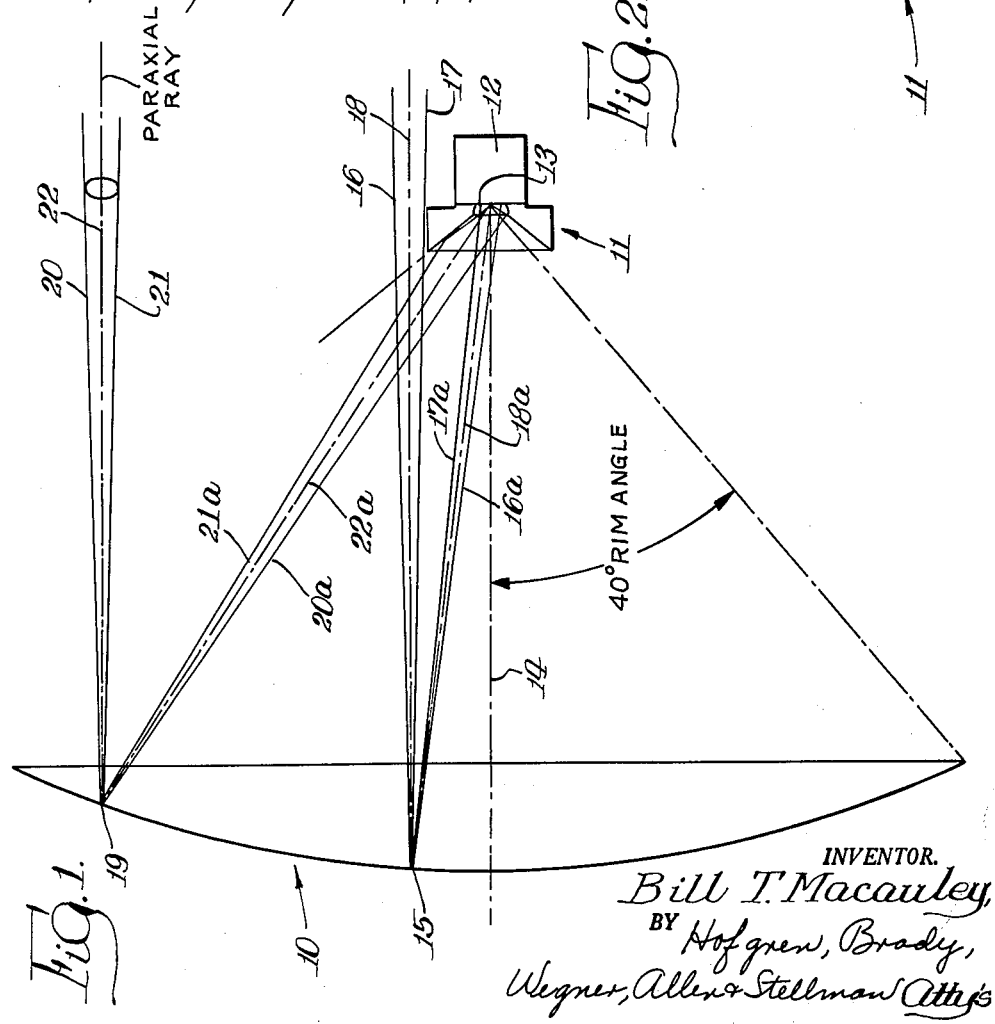
INVENTOR.
Bill T. Macauley,
BY Hofgren, Brady,
Wegner, Allen & Stellman Att'ys April 16, 1963      B. T. MACAULEY      3,085,565
SOLAR ENERGY DEVICE Filed March 10, 1961      2 Sheets-Sheet 2

United States Patent Office 3,085,565
Patented Apr. 16, 1963

3,085,565
SOLAR ENERGY DEVICE
Bill T. Macauley, Arvada, Colo., assignor to Sundstrand Corporation, a corporation of Illinois
Filed Mar. 10, 1961, Ser. No. 94,809
3 Claims. (Cl. 126—270)

This invention relates to a solar energy device and more particularly to a device for increasing the efficiency of energy gathered by parabolic reflectors.

It is the general object of the present invention to produce a new and improved solar energy device of the character described.

It is a more specific object of the invention to produce a device for increasing the efficiency of parabolic reflectors utilized to concentrate solar radiant energy for various purposes.

Parabolic reflectors have been employed to gather and concentrate radiant energy from the sun for the purpose of providing heat which may be converted to other forms of energy. Such devices are particularly useful in conjunction with space vehicles where solar energy can be converted to mechanical energy, which in turn can be utilized to generate electrical current, operate controls, and the like.

As the image of the sun formed at the focus of a parabolic mirror has a size which increases as the focal length of the mirror increases, it is obviously desirable to use a reflector having a relatively short focal length, thus reducing the size of the solar image. Also, as the energy collected by the mirror is generally proportional to the radius squared, larger diameter mirrors are desirable to gather as much energy as possible. The foregoing factors have led to designs of parabolic reflectors which are of relatively large diameter and short focal length. As will hereinafter be explained in more detail, however, increasing the diameter of a parabolic reflector while maintaining a short focal length serves to increase the size of the area at the focal plane of the mirror into which the sun's rays are directed by the mirror. As the energy of such rays are gathered by directing the rays into an opening in a solar furnace or similar device, the openings in such devices must be made larger as the size of the area into which the solar rays are reflected also increases. However, if the opening into the solar furnace is made larger so as to permit all the reflected rays to enter into the furnace, efficiency is lost because such larger opening permits a great deal of the heat entering the furnace to be reradiated therefrom and such reradiation, of course, represents energy which is lost.

According to the present invention, however, there is provided a device which permits the use of a relatively small opening into the solar furnace for the entrance of rays while at the same time permits the use of large, short focal length reflectors, thus giving the advantage of the latter construction without the attendant disadvantages accompanying the larger entrance opening into the solar furnace.

Thus, it is a further object of the invention to produce a solar energy collecting device provided with a solar furnace having an opening permitting the entrance of solar rays reflected from certain portions of the mirror in combination with a secondary reflector which operates to reflect into such opening rays reflected from the primary mirror which would not otherwise pass into the solar furnace.

Other and further objects and advantages of the invention will be apparent from the following description taken in conjunction with the accompanying drawings, in which:

FIG. 1 is a side elevational view showing a primary parabolic mirror used in combination with the apparatus of the present invention;

FIG. 2 is an enlarged sectional view of the secondary reflector of the present invention;

Figure 3:
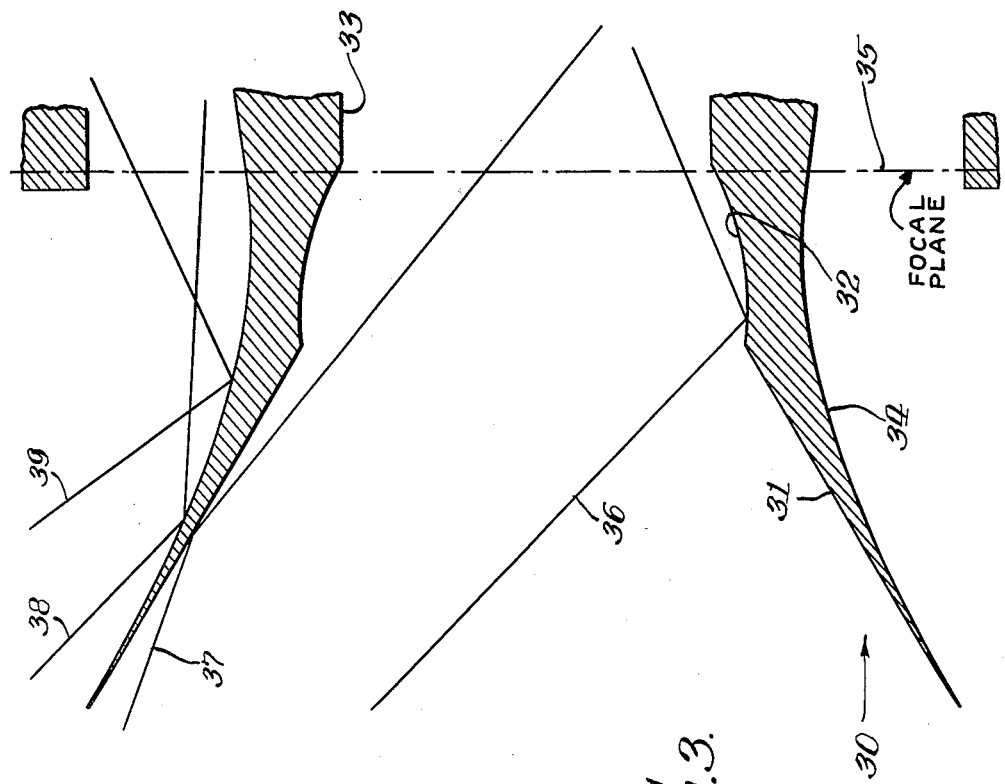
FIG. 3 is a view like FIG. 2 of a modified form of the apparatus.

While this invention is susceptible of embodiment in many different forms, there is shown in the drawings and will herein be descirbed in detail several embodiments, with the understanding that the present disclosure is to be considered as an exemplification of the principles of the invention and is not intended to limit the invention to the embodiments illustrated. The scope of the invention will be pointed out in the appended claims.

The principles of the invention can perhaps best be understood by reference to FIGS. 1 and 2 of the drawings wherein 10 indicates a parabolic reflector utilized as the primary mirror for the collection of solar energy. The secondary mirror of the present invention is generally indicated at 11 and a solar furnace 12 is positioned immediately adjacent the secondary reflector 11. An opening 13 is provided in the center of the secondary reflector 11 to permit the rays of energy reflected from the primary mirror to enter into the solar furnace 12.

For simplicity of description, the device 12 is referred to as a solar furnace but as used herein, that term is intended to include the various devices by which radiant solar energy is absorbed or converted into other forms of energy to perform work.

Assuming for the purposes of illustration that the axis 14 of the primary mirror 10 is directed directly at the sun, the rays of sunlight striking any point, such as the point 15 of the primary mirror, strike that point in the form of a cone made up of the light rays 16 coming from the upper limb of the sun, 17 from the lower limb, and the rays 18 from the center of the sun, together with all of the rays of light intermediate the limb rays 16 and 17. The rays reflected from the point 15 corresponding to the rays 16, 17 and 18 are shown as 16a, 17a and 18a, and form an image of the sun at the focal plane of the primary mirror. The opening 13 is proportioned to permit the extremity rays 16a and 17a to pass therethrough into the solar furnace and is made sufficiently larger than the solar image formed by such rays at the focal plane in order to allow for errors in the surface of the mirror 10. With a theoretically perfect primary mirror, the opening 13 need be no larger than the solar image formed by the rays just described. But inasmuch as errors in the surface will exist, the opening is correspondingly increased in size so as to accommodate for the maximum expected error.

The point 15, it will be noted, is relatively close to hte axis 14 of the primary mirror. Considering now the action of the rays of the sun striking an area of the mirror, for example, the point 19 near the edge of the mirror, the solar cone is formed by the rays 20, 21 and 22 from, respectively, the upper and lower limbs and the center of the sun, and are reflected from the point 19 as rays 20a, 21a and 22a. Due to the optical properties of the parabola, coupled with the fact that the cone of reflected light intersects the focal plane of the mirror at a considerable angle, the solar image formed by the rays 20a–22a will be generally elliptical in shape having a major axis considerably in excess of the diameter of the solar image formed by the reflected rays 16a–18a.

Considering the entire surface of the primary mirror, it is therefore obvious that the solar spot formed at the focal plane by the entire mirror is graduated in intensity from the center of the spot to the outer edge of the spot, inasmuch as the center of the spot receives the paraxial rays from striking the entire surface of the mirror (except that shaded by the secondary mirror 11), while the outer edge of the solar spot receives only the off-axis rays from the outer periphery of the mirror.

Thus, while the reflected ray 22a which is reflected from the center of the sun's disk will enter the opening 13, the rays 20a and 21a are sufficiently spread so as to normally strike elsewhere than through the opening 13. The secondary mirror 11, however, is provided with a first reflecting surface 23 against which the ray 21a strikes and by which such ray is reflected into the opening 13 with the secondary mirror being provided with a second reflecting surface 24 intercepting the ray 20a and reflecting this ray into the opening 13 also. While rays reflected from the surfaces 23 and 24 do not form an optical image at the focal plane, the radiant energy is directed into the opening 13 and thus the size of that opening may be minimized to the extent necessary only to admit the rays close to the axis, for example, 16a–18a plus probable mirror errors, and yet the rays such as 20a and 21a which would otherwise be lost are captured and also directed into the opening 13. With the ability to keep the size of the opening 13 to a minimum, the reradiation of energy outwardly of the opening 13 is reduced considerably.

The surface 23 is generally conical in form and is, of course, highly reflective such as aluminum or the like. The surface near the apex of the cone, i.e., the surface 24 is generally ellipsoidal. It will be noted that this latter surface serves to reflect into the opening 13 the off-axis rays which cross the axis of the primary mirror before reaching the focal plane while the surface 23 reflects into the opening off-axis rays which do not cross the axis 14 of the primary mirror before reaching the focal plane thereof.

Figure 4:
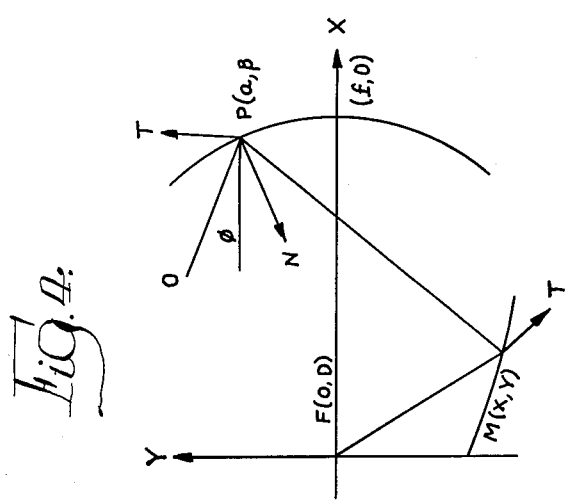
FIG. 4 is a diagram illustrating certain principles of the invention.

The derivation of the surfaces 23 and 24 is illustrated in FIG. 4. Referring to that figure, let OPMF be a ray striking the primary mirror at the point P $(\alpha,\beta)$ (at the angle $\phi$ with respect to its axis) hitting the curve 24 being sought at the point M and subsequently being reflected to F, the entrance opening 13.

The unknown curves can be represented by parametric equations, that is, $$x=x(t) \quad y=y(t)$$

The same parameter $t$ is used for the unknown curve as for the primary mirror. The point M will then have coordinates $x(t)$, $y(t)$ which will henceforth be denoted more simply by $(x, y)$.

The formula for the parameter $t$ is as follows, where $m=\tan \phi$ and $C_1$ is an arbitrary constant:

$$\sqrt{(x-\alpha)^2+(y-\beta)^2}+\sqrt{x^2+y^2}=\frac{-\alpha+m\beta}{\sqrt{1+m^2}}+C_1$$

The constant $C_1$ may be evaluated by establishing the requirement that the unknown curve go through the point $$x=0 \quad \alpha=f$$
$$y=-mf \quad \beta=0$$

The ellipsoidal surface 24 may be expressed by the following formulas:

$$y=\beta+\frac{Q^2-(\alpha^2+\beta^2)}{2[\alpha A+\beta-Q\sqrt{1+A^2}]}$$

and $$x=\alpha+A\frac{Q^2-(\alpha^2+\beta^2)}{2[\alpha A+\beta-Q\sqrt{1+A^2}]}$$

where $$\alpha=f(1-\tan^2 t/2)$$
$$\beta=2f \tan t/2$$
$$A=\frac{1-2m \tan t/2-\tan^2 t/2}{m+2 \tan t/2-m \tan^2 t/2}$$

$$Q=fm+\frac{f}{\sqrt{1+m^2}}\{(m+\tan t/2)^2+1\}$$

The above equations are the desired parametric equations of the curve 24. It is now possible to select the parameter $t$ to be the polar coordinate angle of the point $(\alpha,\beta)$ and obtain formulas for the quantities therein in terms of this parameter.

The secondary reflecting surfaces illustrated in FIGS. 1 and 2 can be utilized with the advantages indicated in conjunction with mirrors having a rim angle up to about 45°. In the drawings, the primary mirror has a rim angle of 40°, the term signifying the angle at the focal plane between the axis of the mirror and the intersection of the axis of the mirror and the edge thereof. Parabolas with rim angles over 45° and approaching 90° produce rays converging at such wide angles so as to cause some of them to strike the outer surface of the secondary mirror 11 and thus be lost. To provide a secondary mirror suitable for use in conjunction with primary parabolas of large rim angle, the device of FIG. 3 has been designed. As shown in this figure, the secondary mirror 30 is provided with a first surface 31 similar to the surface 23 and a second surface 32 similar to the surface 24 for reflecting the rays striking the inner area of the mirror into the opening 33 in the solar furnace attached thereto. The device of FIG. 3, however, is also provided with a back reflective surface 34 for reflecting rays striking that surface into an annular opening 35 encircling the device and also opening into the solar furnace. Thus, a ray 36 reflected from a point approximately corresponding to the point 19 of FIG. 1 (and thus a ray similar to the ray 20a) is reflected from the surface 32 into the opening 33 while a ray 37 (generally similar to ray 21a) is reflected from the surface 31 into the same opening. Rays 38 and 39 reflected from points perhaps 50° to 60° off the axis of the principal mirror strike the surface 34 and are reflected by that surface into the annular opening 35 and thus also into the solar furnace. The curve 35 is generally ellipsoidal.

As indicated earlier with reference to the description of the device illustrated in FIGS. 1 and 2, the opening 13 has a diameter determined by the diameter of the solar image formed at the focal plane by rays reflected from points near the axis of the primary mirror plus an additional diameter sufficient to permit the capture of rays reflected from such areas but somewhat misdirected due to errors in the mirror. Error rays generated at a point other than those at the axis of the parabolas and which strike the surfaces 23 and 24 will also be directed into the opening 13 if the magnitude of the errors at the points where the rays are generated is no greater than that contemplated for the central areas of the primary mirror.

It will be obvious to those skilled in the art that the secondary reflecting surfaces provided by the present invention overcome the undesired characteristic found in the past that increasing mirror diameters and rim angles requires a corresponding increase in the opening leading into the solar furnace with the attendant reradiation losses which will accompany each increase in diameter in such opening. By virtue of the invention, the efficiency of the primary mirror is greatly increased and a substantially larger percentage of the energy reflected therefrom is utilized without diminution by reradiation.

I claim:
1. A solar energy concentrating device comprising a primary parabolic mirror for forming at its focal plane a solar spot of decreasing intensity from the center to the edge of said spot, a secondary mirror located on the axis of the primary mirror and adjacent but inwardly spaced from the focal plane thereof, said secondary mirror being provided with an opening adapted to communicate with a solar furnace, said opening having a diameter less than the diameter of said solar spot, said secondary mirror being provided with a first reflective surface generally ellipsoidal in configuration and immediately surrounding the opening, and a second reflective surface in the form of a cone diverging from said first surface toward said primary mirror whereby to direct into said opening the rays forming the portion of the solar spot surrounding the opening.

2. A solar energy concentrating device comprising a primary parabolic mirror for forming at its focal plane a solar spot of decreasing intensity from the center to the edge of said spot, a secondary mirror located on the axis of the primary mirror and adjacent but inwardly spaced from the focal plane thereof, said secondary mirror being provided with an opening adapted to communicate with a solar furnace, said opening having a diameter less than the diameter of said solar spot, said secondary mirror being provided with a reflective surface surrounding said opening which diverges therefrom toward said primary mirror to intercept and reflect into said opening the rays forming the portion of the solar spot surrounding the opening, and means forming a reflective outer surface surrounding said secondary mirror for reflecting rays from the primary mirror into an annular opening adapted to surround said secondary mirror and to open into a solar furnace.

3. A radiant energy concentrating device comprising a primary parabolic mirror for forming at its focal plane a spot of reflected radiant energy of decreasing intensity from the center to the edge of said spot, a secondary mirror located on the axis of the primary mirror and adjacent but inwardly spaced from the focal plane thereof, said secondary mirror being provided with an opening, said opening having a diameter less than the diameter of said spot, said secondary mirror being provided with a first reflective surface generally ellipsoidal in configuration and immediately surrounding the opening, and a second reflective surface in the form of a cone diverging from said first surface toward said primary mirror whereby to direct into said opening the rays forming the portion of the spot surrounding the opening.

References Cited in the file of this patent

UNITED STATES PATENTS

| | | |
|---|---|---|
| 980,505 | Emmet | Jan. 3, 1911 |
| 1,484,454 | Shoenberg | Feb. 19, 1924 |
| 1,661,473 | Goddard et al. | Mar. 6, 1928 |
| 1,696,003 | Harvey | Dec. 18, 1928 |
| 2,182,222 | Courtis et al. | Dec. 5, 1939 |